United States Patent
Watanabe

(10) Patent No.: US 10,069,981 B2
(45) Date of Patent: Sep. 4, 2018

(54) FILE TRANSMISSION APPARATUS AND IMAGE READING APPARATUS

(71) Applicant: Oki Data Corporation, Tokyo (JP)

(72) Inventor: Tadayuki Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/269,205

(22) Filed: Sep. 19, 2016

(65) Prior Publication Data

US 2017/0094073 A1 Mar. 30, 2017

(30) Foreign Application Priority Data

Sep. 28, 2015 (JP) .................................. 2015-189930

(51) Int. Cl.
H04N 1/00 (2006.01)
H04N 1/32 (2006.01)

(52) U.S. Cl.
CPC ..... *H04N 1/00225* (2013.01); *H04N 1/00212* (2013.01); *H04N 1/32128* (2013.01); *H04N 2201/0094* (2013.01); *H04N 2201/3226* (2013.01); *H04N 2201/3278* (2013.01)

(58) Field of Classification Search
CPC ........... H04N 1/00225; H04N 1/00212; H04N 1/32128; H04N 2201/0094; H04N 2201/3226; H04N 2201/3278
See application file for complete search history.

(56) References Cited

U.S. PATENT DOCUMENTS

| 2006/0192990 A1* | 8/2006 | Tonegawa | H04N 1/00209 358/1.15 |
| 2008/0294737 A1* | 11/2008 | Kim | G06Q 10/107 709/206 |
| 2012/0050823 A1* | 3/2012 | Khawaja | H04N 1/00212 358/474 |

FOREIGN PATENT DOCUMENTS

JP 2012238096 A 12/2012

OTHER PUBLICATIONS

JP 2012238096 english translation.*

* cited by examiner

*Primary Examiner* — Iriana Cruz
(74) *Attorney, Agent, or Firm* — Panitch Schwarze Belisario & Nadel LLP

(57) ABSTRACT

A file transmission apparatus includes a mail producing section that produces an email for transmitting a transmission object file, a file name producing section that produces a file name of the transmission object file based a character string included in the email processed by the mail producing section and that assigns the produced file name to the transmission object file, and a transmission section that attaches, to the email, the transmission object file with the file name assigned at the file name producing section and that transmits the email, to make user's manipulation significantly simplified and the usability further improved.

9 Claims, 6 Drawing Sheets

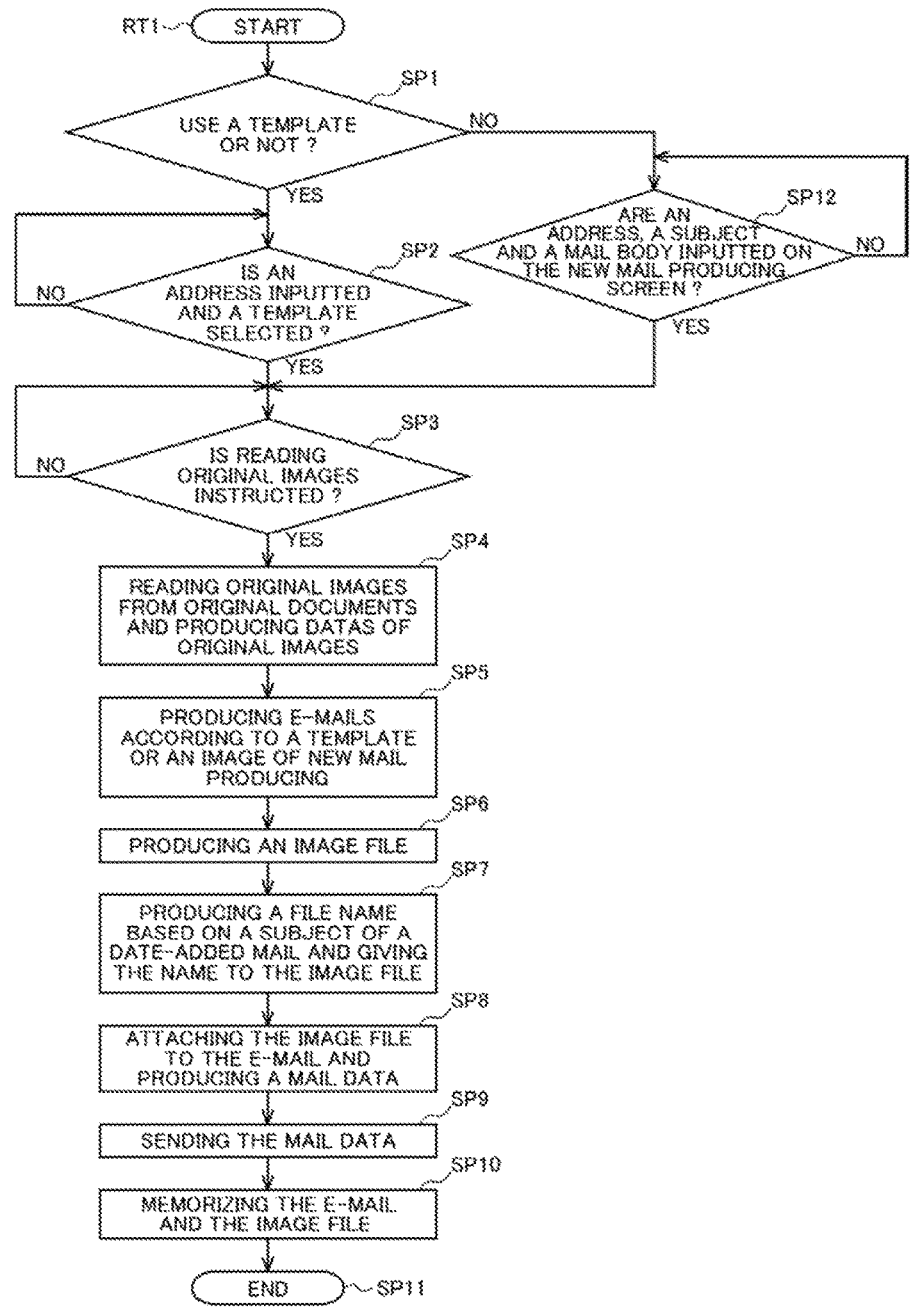

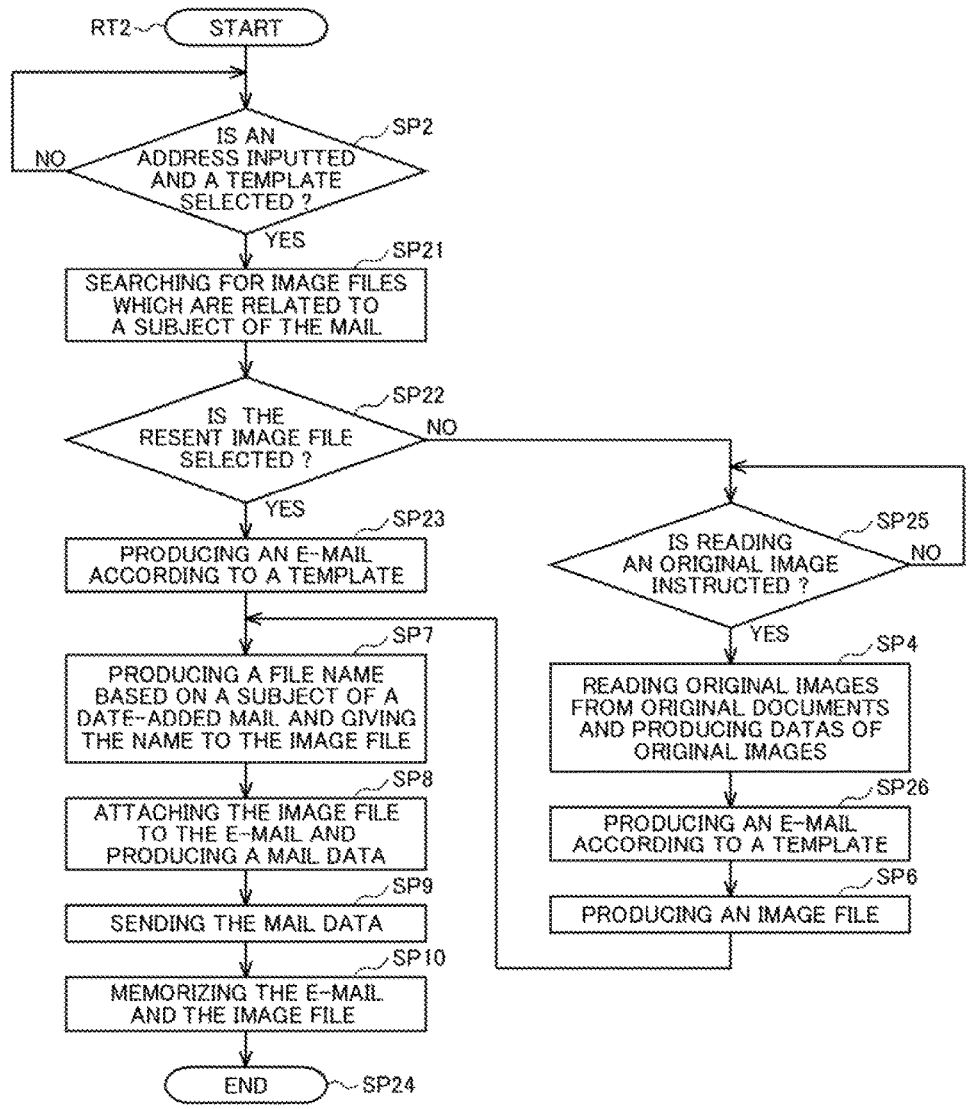

FILE TRANSMISSION APPARATUS AND IMAGE READING APPARATUS

CROSS REFERENCE TO RELATED APPLICATION

This application claims priority benefits under 35 USC, section 119 on the basis of Japanese Patent Application No. 2015-189930, the disclosure of which is incorporated herein by reference.

BACKGROUND OF THE INVENTION

1. Field of the Invention

This invention relates to a file transmission apparatus and an image reading apparatus and, more particularly, to an apparatus suitably applicable to an image reading apparatus having, e.g., a scan-to-email function in which an image file as a transmission object is produced upon reading an original image from an original document at a scanner section and is transmitted where the image file is attached to an email.

2. Description of Related Art

Conventional image reading apparatuses typically memorize in advance templates entered with a mail title and a part of mail massage words in a memory for producing emails when realizing a scan-to-email function. Although producing image files of the transmission, object upon reading the original images from the original documents with the scanner as the scan-to-email function when transmitting the files, the image reading apparatuses reduce workloads of entering letters for producing emails by producing the emails attached with the image files in use of the templates read out of the memory (see, e.g., Japanese Patent Application Publication No. 2012-238096).

With the conventional image reading apparatuses, it is required to assign a file name representing file contents to the image file in a case where the image files transmitted in being attached to the emails are readily managed at sides of the sender and the sendee. Such conventional image reading apparatuses, however, assign the file name that the user arbitrarily inputs prior to production of the image file, to the image file attached and transmitted with the email, or assign the file name such as a serial number automatically produced regardless the file contents in response to the image file. In those conventional image wading apparatuses, the file name representing the file contents has to be inputted by the user before the production of the image file or before the automatic production of the file name, and consequently there arises a problem such that the image reading apparatus reduces its convenience.

SUMMARY OF THE INVENTION

It is therefore an object of the invention to provide a file transmission apparatus and an image reading apparatus improving its convenience, in consideration of the above problems.

In an aspect according to the invention, a file transmission apparatus includes a mail producing section that produces an email for transmitting a transmission object file, a file name producing section that produces a file name of the transmission object file based a character string included in the email processed by the mail producing section and that assigns the produced file name to the transmission object file, and a transmission section that attaches, to the email, the transmission object file with the file name assigned at the file name producing section and that transmits the email.

These and other objects, features, aspects and advantages of the disclosed disc brake caliper will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 8 is a flowchart allowing steps of processing file transmission according to the embodiment; and FIG. 9 is a flowchart showing steps of processing file retransmission according to the embodiment.

DETAILED DESCRIPTION OF EMBODIMENTS

Hereinafter, an embodiment according to the invention is described in detail with reference to the drawings.

1-1 Circuit Structure of Image Reading Apparatus

Figure 1:
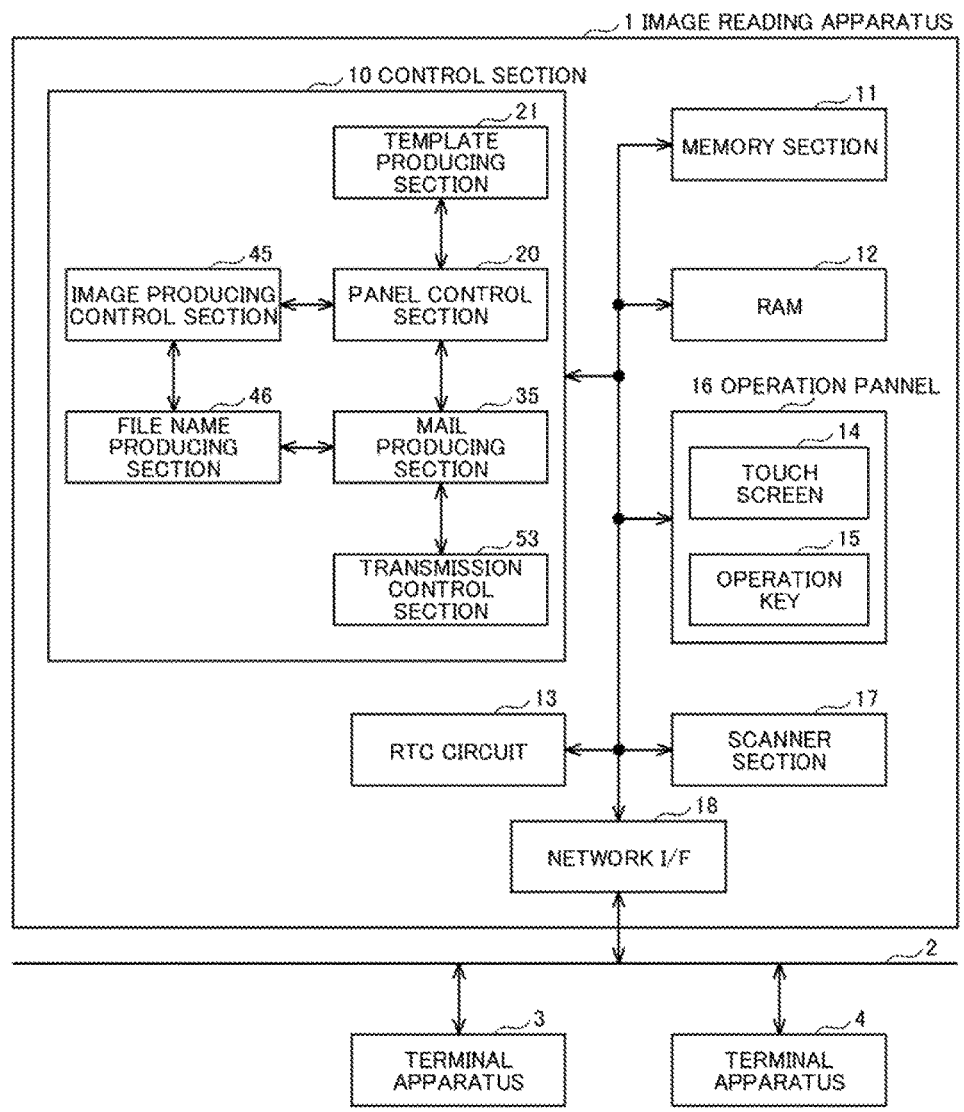
FIG. 1 is a block diagram showing a circuit structure of an image reading apparatus according to an embodiment of the invention.
Figure 2:
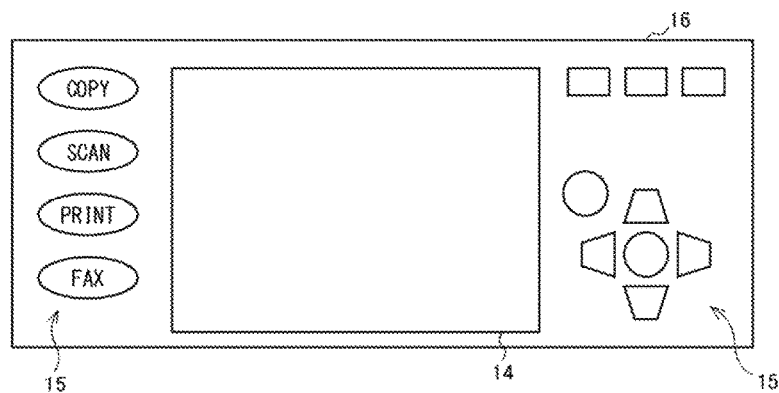
FIG. 2 is an illustration showing a structure of an operation panel according to the embodiment.

In FIG. 1, an image reading apparatus 1 according to the embodiment is shown. The image reading apparatus 1 is, e.g., an MFP (Multi-Function Peripheral) having a scan-to-email function, and can transmit image files as transmission objects in attached to an email or emails to terminal apparatuses 3, 4 such as personal computers and smart phones as sendee's devices via a network 2 such as the Internet. The scan-to-email function is a function that an image file as a transmission object is produced upon reading an original image from an original document at a scanner section and is transmitted where the image file is attached to an email. The image reading apparatus 1 in fact has a control section 10 including CPU (central processing unit) or microprocessor. The control section 10 is connected to a memory section 11 such as ROMs (read only memories) or a hard disc drive, a RAM (random access memory) 12 as a work area of the control section 10, and a RTC (real time clock) circuit 13. The control section 10 is further connected to an operation panel having a touch screen 14 displaying various images on a display screen as shown in FIG. 2 and being subject to touching manipulations, and manipulation keys 15 in plural types to be pushed down. The control section 10 is connected to a scanner section 17, and a network interface 18, which is connected to the network 2. The control section 10 may include a template producing section 21 for producing email templates, a panel control section 20 for controlling an operation panel, an image producing control section (or image production control section) 45, a mail producing section 35 for producing an email, a file name producing section 46 for producing a file name for a transmission object file attached to the email, and a transmission control section (or transmission section) 53 for transmitting the email.

The operation panel 16 shown in FIG. 2 is arranged with the touch screen 14, e.g., at a center thereof. The operation panel 16 is arranged with plural function keys for respectively selecting the copy function, the scan-to-email function, the print function, and the facsimile function, which can be performed with the image reading apparatus 1. The operation panel 16 is arranged with such as direction keys for moving the cursor, not shown, on the touch screen 14, and an enter key instructing execution of the processing according to the various functions, as manipulation keys 15 provided on a right, side of the touch screen 14. The scanner section 17 includes, though not specifically shown, such as an original document plate made of a glass plate for setting one sheet of the original document, an ADF (automatic document feeder) feeding automatically and successively one or more original documents to an image reading position near the glass plate, and an image sensor optically reading the original document images on a surface of the original documents brought at the image reading position via the original document plate. With this structure, the scanner section 17 can read solely the original document images of the original documents at the image reading portion where the original document as the reading object is a single sheet, and can read the original document images of the original documents successively at the image wading position where the original documents as the reading objects are plural.

The control section 13 properly reads out the various programs such as a basic program, a template production processing program, a file transmission processing program, and a file retransmission processing program, which are previously memorized in the memory section 11, and extends those programs to the RAM 12. With this processing, the control section 10 integrally controls the whole of the image reading apparatus 1 according to the various programs extended at the RAM 12 and executes the various processings realizing such as the template producing function and the scan-to-email function. Hereinafter, the various processings executed at the control section 10 are described. In the description below, the various functions realized according to the various programs at the control section 10 are shown as functional circuit blocks for the sake of convenience, and the various processings that the control section 19 executes according to the various programs are described as the processings executed at the respective functional circuit blocks. The image reading apparatus 1 may be structured in having circuit blocks of a hardware structure executable of substantially the same processings done with the functional circuit blocks shown below and in executing the various processings that the control section 10 executes with the circuit blocks of the hardware structure.

Figure 3:
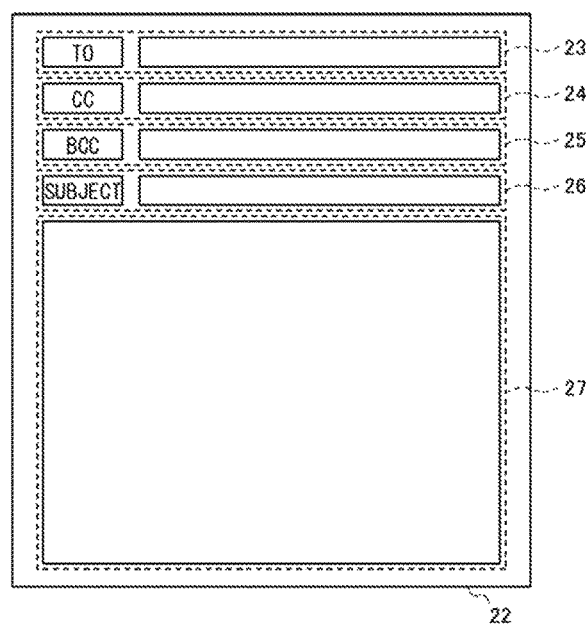
FIG. 3 is an illustration showing a structure of a new email production image according to the embodiment.
Figure 4:
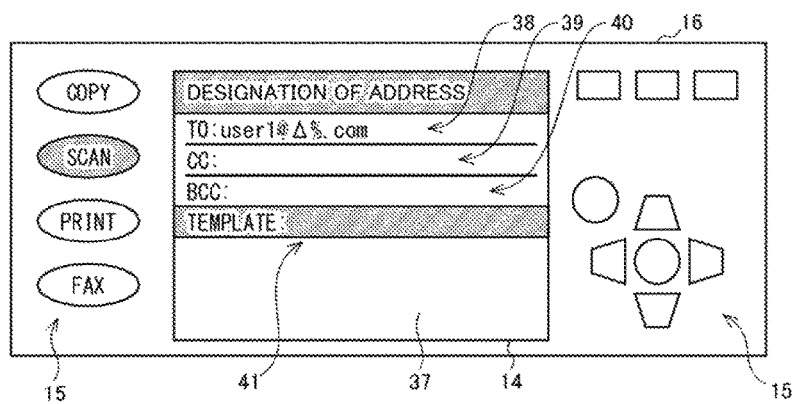
FIG. 4 is an illustration showing a production of templates made by a template producing section according to the embodiment.

The panel control section 20 functions as an input processing unit notifying the corresponding circuit blocks upon interpreting various instructions or commands entered from the user via the operation panel 16, or namely by manipulation of the touch screen 14 and the plural manipulation keys 15. The panel control section 20 also functions as a display control section controlling display of images based on various image data with respect to the touch screen 14 by sending the various image data given from the respective circuit blocks. The template producing section 21 reads out previously memorized, new email production image data from the memory section 11 when the user requests the production of the template for email production via the operation panel 16. The template producing section 21 transmits the new email production image data to the touch screen 14 via the panel control section 20, thereby displaying the new email production image 22 on the touch screen 14 as shown in FIG. 3 based on the new email production image data.

The new email production image 22 is formed with first to third address entry portions 23 to 25 for entering the email addresses as the sendees indicating the destinations of the email, a subject entry portion 26 for entering the mail subject of the email, and a massage entry portion 27 for entering the mail message of the email. The first address entry portion 23 is for entering an email address of the sendee as a main addressee of the email, and is displayed with letters of "TO" indicating this purpose. In the description below, the email address entered into the first address entry portion 23 is referred to as the first sendee address, and the sendee specified from the first sendee address is referred to as the first sendee.

The second address entry portion 24 is for entering an email address of the sendee as a subsidiary addressee of the email for confirmation or sharing of the email sent to the first sendee, and is displayed with letters of "CC (carbon copy)" indicating this purpose. In the description below, the email address entered into the second address entry portion 24 is referred to as the second sendee address, and the sendee specified from the second sendee address is referred to as the second sendee. The third address entry portion 25 is for only displaying an email address of this third sendee as a subsidiary addressee of the email to be sent to the first sendee and/or not displaying at other sendees, and is displayed with letters of "BCC (blind carbon copy)" indicating this purpose. In the description below, the email address entered into the third address entry portion 25 is referred to as the third sendee address, and the sendee specified from the third sendee address is referred to as the third sendee.

The template producing section 21, under this suite, arbitrarily receives entries of, e.g., the email subject and the email message to the subject entry portion 26 and the massage entry portion 27, respectively, on the new email production image 22 via the operation panel 16 from the user, and if the registration of the template is requested, template data are produced based on the new email production image data. That is, the template producing section 21 synthesizes email subject data like a text showing an email subject and email message data like a text, showing an email message to the new email production image data. With this production, the template producing section 21 makes the new email production image data 22 entered with (or describing) the email subject and the email message to the subject entry portion 26 and the massage entry portion 27 as the template for email production, and produces the template data of this template. The template producing section 21 adds, to the template data, template identification information particular to the template data inputted by the user through the operation panel 16 or produced automatically. The template producing section 21 sends the template data to the memory section 11 and memorizes the data. The template producing section 21 further registers the template to a template management list, not shown, previously produced on the memory section 11 by sending and memorizing the template identification information to the memory section 11.

The template producing section 21 may produce with inputting the first sendee addresses, and the second sendee addresses and/or the third sendee addresses in arbitrary numbers to the first address entry portion 23, and the second address entry portion 24 and/or the third address entry portion 25, with respect to the template for email production transmitted to the same sendees, or namely the first sendee, and the second sendee and/or the third sendee with the email subject such as, e.g., "the minutes of the meeting." In the following description, where it is not necessary to distinguish the first sendee address, the second sendee address, and the third sendee address from each other, those are referred simply to as the email address of the sendee. As shown in FIG. 1, the template producing section 21 produces the templates 30 to 34 that the user wants for producing emails at each time that the user requests production of the template, and memorizes those as the template data in the memory section 11.

Figure 5:
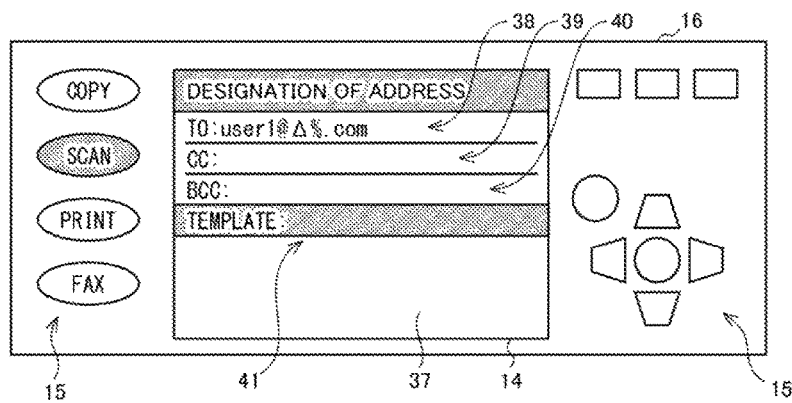
FIG. 5 is an illustration showing a structure of a sendee entry image displayed on a touch screen according to the embodiment.

The mail producing section 35 reads out template use inquiry image data previously memorized from the memory section 11 where, e.g., single or plural original documents as the reading object are set to the scanner section 17 by the user, and the scan-to-email function is selected through the operation panel 16. The mail producing section 35 displays the template use inquiry image, not shown, on the touch screen 14 by transmitting the template use inquiry image data to the touch screen 14 via the panel control section 20. The template use inquiry image includes a description of a certain message as an inquiry as to whether any of the templates 30 to 34 is to be used for producing an email to realize the scan-to-email function. The mail producing section 35 reads out address entry image data previously memorized from the memory section 11 where the user selects any use of the templates 30 to 34 for producing the email via the operation panel 16 as a result of displaying the template use inquiry image. The mail producing section 35 displays an address entry image 37 as shown in FIG. 5 based on the address entry image data on the touch screen 14 by transmitting the address entry image data to the touch screen 14 via the panel control section 20.

Figure 6:
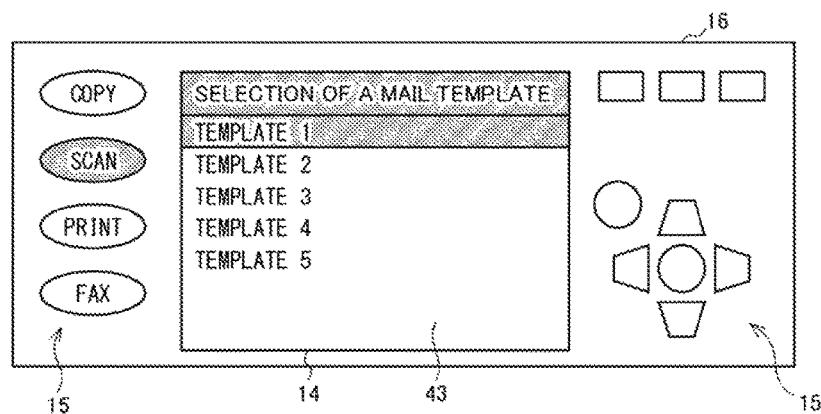
FIG. 6 is an illustration showing a structure of a template selection image displayed on a touch screen according to the embodiment.

The address entry image 37 is formed with first to third address entry portions 38 to 40 for entering the first to third sendee addresses, respectively, and a template presentation instruction icon 41 for instructing presentation of the templates 30 to 34. The mail producing section 35 therefore renders the user enter at least the first sendee address as the destination of the email on the address entry image 37 via the operation panel 16. The mail producing section 35 further reads out the template management list, from the memory section 11 if the user instructs the presentation of the templates 30 to 34 via the template presentation instruction icon 41 on the address entry image 37. The mail producing section 35 produces template presentation image data based on the template management list and transmits the data to the touch screen 14 via the panel control section 20. With this processing, the mail producing section 35 displays the template presentation image 43 as shown in FIG. 6 based on the template presentation image data on the touch screen 14 in lieu of the address entry image 37. The mail producing section 35 presents, to the user, all of the templates 30 to 34, or namely all of templates memorized in the memory section 11 up to this time, usable for production of the email, via the template presentation image 43, as the template identification information in a form of listing.

At that time, the mail producing section 35 reads out the template data of the selected templates 30 to 34 from the memory section 11 if the user selects any of the templates 30 to 34 on the template presentation image 43 via the operation panel 16 as the template identification information. The mail producing section 35 transmits the template data to the touch screen 14 via the panel control section 20. With this processing, the mail producing section 35 can show to the user the templates 30 to 34 based on the template date on the touch screen 14 in lieu of the template presentation image 43. Where the user instructs the mail producing section 35 to display again the template presentation image 43 via the operation panel 16, the mail producing section 35 displays the template presentation image 43 on the touch screen 14 in response to this in lieu of the templates 30 to 34. If the user chooses any of the templates 30 to 34 again as the template identification information, the mail producing section 35 similarly displays the chosen templates 30 to 34 on the touch screen 14. Thus, the mail producing section 35 actually shows the templates 30 to 34 to the user to render the user confirm as to whether the template is used for production of the email and select the desired templates 30 to 34 used for producing the email.

The image production control section 45 controls the scanner section 17 according to a transmission image production condition previously set in advance where the user instructs reading of the original document via the operation panel 16. The transmission image production condition is set for various items to produce the image files of the transmission object based on the original document images such as, e.g., definitions at a time reading out original images from the original documents, and file formats of image files produced based on the read original document images. With this control, the image production control section 45 optically reads the original document images of single or plural original document s as the reading object from the scanner section 17 to produce the single or plural original document image data (or namely, for each original document), and fetches the data. The image production control section 45 produces the image files of single or plural sheets (or namely, for each original document) storing the original document image data and transmits the files to the file name producing section 46, after making prescribed data processing properly to the single or plural original document image data according to the image production control condition.

The mail producing section 35 produces the email using the templates 30 to 34 while the image production control section 45 produces the image files based on the original document images when the user instructs reading of original document images. That is, the mail producing section 35 fetches the email subject from the templates 30 to 34 selected by the user when the user instructs reading of the original document images. The mail producing section 35 detects the current data and time measured at the RTC circuit 13 as the mail date and time. The mail producing section 35 produces a new email subject (hereinafter, referred to as "date and time addition email subject") in adding email production date and time information, a character string of numbers and signs indicating the email production date and time, to the end of words of the email subject, and inserts the date and time addition email subject into the email subject entry portion 26 of the templates 30 to 34. That is, the mail producing section 35 replaces the email subject of the templates 30 to 34 with the date and time addition email subject having the email production date and time information connected to the email subject. In the following description, a portion of the original email subject, or namely the email subject entered by the user, on a head side in the date and time addition email subject is referred to as an "entry subject portion" whereas a portion of the email production date and time information on a tail side is referred to as a "date and time portion."

The mail producing section 35 further inserts the email addresses of the sendee or sendees entered by the user on the address entry image 37 into the first to third address entry portion of the templates 30 to 34. The mail producing section 35 thus produces the email based on the templates 30 to 34 selected by the user. The mail producing section 35 transmits the email subject date indicating the date and time addition email subject produced at that time to the file name producing section 46. The mail producing section 35, when producing the email using the templates 30 to 34 in a manner described above, can make live user confirm the contents of the email (the date and time addition email subject and the email message, as well as the email address of the sendee) by displaying the information on the touch screen 14 via the panel control section 20.

The file name producing section 46 produces the file name of the image file based on the date and time addition email subject notified as the email subject from the mail producing section 35, when receiving single or plural image files from the image production control section 45. That is, when receiving a single image file from the image production control section 45, the file name producing section 46 judges as to whether the word count of the email subject of the date and time addition email subject is equal to or less than the maximum word count of the file name in comparing the word count of the date and time addition email subject with the maximum word count of the file name. Consequently, if the word count of the email subject is equal to or less than the maximum word count of the file name, the file name producing section 46 produces the file name having the same character string as the character string of the date and time addition email subject based on the date and time addition email subject and attaches the file name to the image file. To the contrary, if the word count of the email subject, is greater than the maximum word count of the file name, the file name producing section 46 properly deletes, e.g., the words on the end side of the entry subject portion of the date and time addition email subject, and reduces the word count of the date and time addition email subject coinciding to the maximum word count of the file name. The file name producing section 46 thus produces the file name having the same character string as that of the date and time addition email subject based on the date and time addition email subject with the reduced word count of the email subject, and assigns the file name to the image file.

The file name producing section 46 detects the file total number of the image files where receiving the plural image files from the image production control section 45. The file name producing section 46 also compares the email subject word count with the maximum word count of the file name in substantially the same manner, and reduces properly the email subject word count of the date and time addition email subject according to the compared result. The file name producing section 46 produces the file names of those plural image files based on the date and time addition email subject of the email subject word count equal to or less than the maximum word count of the file name, whose word count is properly reduced, and respective additional information data different from each other in the total number of the files. That is, the file name producing section 46 produces the file names in the total file number in a way to add one piece of the respective additional information to the word end of the character string so as not to overlap each other, though producing the file names each having, on the head side, the same character string as that of the date and time addition email subject.

The respective additional information of each file name can be in various types such as, e.g., serial numbers (1), (2), (3), . . . , alphabetic letters A, B, C, . . . , and character strings (1/N), (2/N), (3/N), . . . , indicating respective sequential number divided by the total number N of the files. The file name producing section 46 is therefore set to use, e.g., the respective additional information of one type selected arbitrarily by the user among those various types of the respective additional information. The file name producing section 46 produces the plural file names using the respective additional information according to the setting, together with the date and time addition email subject, when receiving the plural image files from the image production control section 45. The file name producing section 46 assigns the file names different from each other to the plural image files.

The maximum word count of the file name described above is set to, e.g., a certain number slightly less than the defined maximum word count, which is defined for file name production through the basic program installed in the image reading apparatus 1. The file name producing section 46, with this setting, produces the file name having the word count equal to or less than the defined maximum word count for single or plural image files even where the email subject word count of the date and time addition email subject is a relatively large number. Thus, the file name producing section 46 transmits the single or plural image files assigned with the file name where producing the file name and assigning the file name to the single or plural image files.

The image reading apparatus 1 may operate the file name producing section 46 to reduce the email subject word count of the date and time addition email subject so as to coincide with the maximum word count of the file name by properly deleting words at various portions such as, e.g., words on the tail side (or head side) of the date and time portion of the date and time addition email subject, or words of both of the entry subject portion on the tail side (or the head side) and the date and time portion on the tail side (or the head side), where the email subject word count is larger than the file name maximum word count. Where the user can choose the desired word count reduction method among the various word count reduction methods having word deletion portions different from each other with respect to the date and time addition email subject, the image reading apparatus 1 may operate the file name producing section 46 to delete the words or letters of the date and time addition email subject according to the setting, where the email subject word count is larger than the file name maximum word count. Where some use prohibited words not used for production of the file name according to the basic program installed in the image reading apparatus 1 are defined, the image reading apparatus 1 may operate the file name producing section 46 to search the use prohibited words in the character strings of the date and time addition email subject. The image reading apparatus 1 operates the file name producing section 46 to use the date and time addition email subject for the production of the file names as it is if the date and time addition email subject does not include any use prohibited word. If the date and time addition email subject includes some use prohibited word, the image reading apparatus 1 may operate the file name producing section 46 to use the date and time addition email subject in which the use prohibited words are deleted, for the production of the file names, upon automatically deleting the use prohibited words from the date and time addition email subject.

Figure 7:
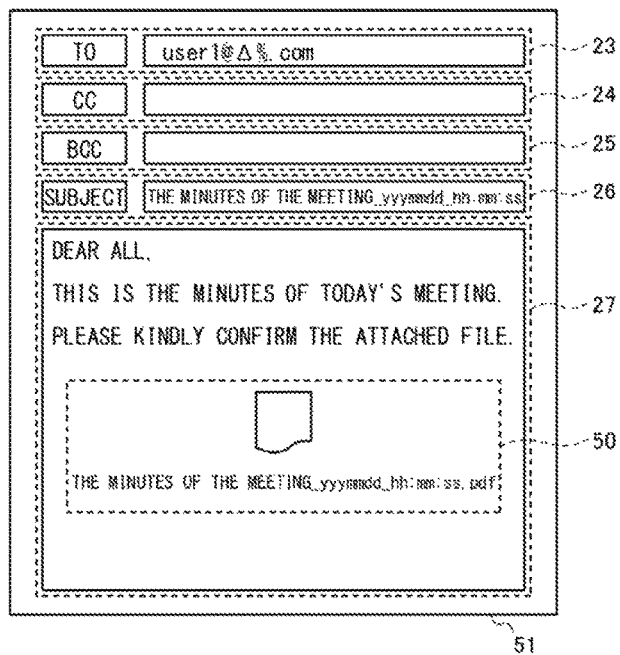
FIG. 7 is an illustration showing production of an email and mail data by a mail producing section according to the embodiment.

As shown in FIG. 7, where receiving single or plural image files 50 from the file name producing section 46, the mail producing section 35 attaches the single or plural image files 50 to an email 50 produced at that time. FIG. 7 shows an example that the email 51 is attached with the single image file 50. Where the email 51 is thus attached with single or plural image files 50, the mail producing section 35 displays the email on, e.g., the touch screen 14 via the panel control section 20, thereby notifying the use of attaching the single or plural image files 50 to the email 51.

The mail producing section 35 produces email data showing the email 51 attached with the single or plural image files 50. The email data is structured of a data format attaching a email header to a head of the email body portion. The mail producing section 35 produces email data storing the message data showing the email message and the single or plural image files 50 attached to the email to the email body portion and storing such as, e.g., address data showing the email address of the sender, address data showing the email address of the sendee, and email subject data showing the date and time addition email subject. The mail producing section 35 transmits the mail data to the transmission control section 53. With this processing, the transmission control section 53 transmits the email data to the sendee via the network interface 18 according to the email address of the sendee.

To the contrary, the mail producing section 35 reads out new email production image data from the memory section 11 if the user chooses that no template is used for production of the email where the template use inquiry image is displayed on the touch screen 14 as described above. The mail producing section 35 displays the new email production image 22 upon transmitting the new email production image data to the touch screen 14 via the panel control section 20. With this processing, the mail producing section 35 renders the user enter at least the first sendee address as the destination of the email on the new email production image 22 via the operation panel 16 and enter the email subject and the email message of the email. Where the user instructs reading of the original document images, the mail producing section 35 fetches the email subject from the email subject entry portion 26 of the new email production image 22. The mail producing section 35 then produces, in substantially the same manner, the date and time addition email subject in attaching the email production date and time information to the tail of the email subject, and inserts the date and time addition email subject to the email subject entry portion 26 of the new email production image 22, thereby producing the email bawd on the new email production image 22. The mail producing section 35 at that time, also transmits the email subject data indicating the date and time addition email subject, to the file name producing section 46.

The image production control section 45 produces the single or plural image files based on the original document image of the single or plural original documents in substantially the same way as described above and transmits the files to the file name producing section 46, if the user instructs reading of the original document images. The file name producing section 46 produces the single, or plural file names in substantially the same way as described above based on the date and time addition email subject notified as the email subject data from the mail producing section 35 and assigns the file names to the image files, when receiving the single or plural image files from the image production control section 45. The file name producing section 46 transmits the single or plural image files assigned with the file names to the mail producing section 35. When receiving the single or plural image files from the file name producing section 46, the mail producing section 35 attaches the single or plural image files to an email. The mail producing section 35 produces the email data showing the email attaching the single or plural image files in substantially the same way as described above and transmits the data to the transmission control section 53. With this processing, the transmission control section 53 transmits the email data to the sendee via the net work interface 18 according to the email address of the sendee. The mail producing section 35 thus makes the original document images of the single or plural original documents as the single or plural image files as the transmission objects, and can transmit the images to the terminal apparatuses 3, 4 as the sendees upon attaching the images to the email produced based on the templates 30 to 34 and the new email production image 22, or namely upon utilizing the email.

In the image reading apparatus 1, the email subject entered in the subject, entry portion 26 of the templates 30 to 34 and the new email production image 22 by the user shows the transmission purpose of the email, where the email is produced and transmitted based on the templates 30 to 34 and the new email production image 22. When the email is used for transmission of the image files as the transmission objects, the transmission purpose of the email exists in the transmission of the image files in the image reading apparatus 1. Accordingly, with the image reading apparatus 1, the email subject entered in the subject entry portion 26 of the templates 30 to 34 and the new email production image 22 used for production of the email shows file contents of the image files transmitted in use of the email, or namely reflects the contents of the original document images. In the image reading apparatus 1, the file name producing section 46 automatically produces the file names of the image files based on the email subjects. At a time of the file transmission in which the image files are attached to the email and are transmitted from the scan-to-email function, the file name showing the file contents can be easily produced and assigned to the image files in the image reading apparatus 1, even if the user does not input any file name. Particularly, with the image reading apparatus 1, where the email used for transmission of the image files are produced based on the templates 30 to 34, it is not necessary for the user to enter the email subject and the email message, as well as the file name, so that the user' manipulations at that, time can be made significantly easier.

In the image reading apparatus 1, actually, the date and time addition email subject is produced in adding the email production date and time information to the email subject entered in the subject entry portion 26 of the templates 30 to 34 and the new email production image 22 by the user, at the mail producing section 35 at a time of the file transmission. In the image reading apparatus 1, the file name producing section 46 produces the file name composed of the entry subject portion and the date and time portion of the date and time addition email subject based on the date and time addition email subject. That is, in the image reading apparatus 1, the file name producing section 46 produces the file name whose entry subject portion indicates the file contents of the image file and whose date and time portion indicates the email production date and time of the email attached with the image file. Accordingly, in the image reading apparatus 1, even where using templates 30 to 34 having the same email subject or using the new email production image 22 entered with the same email subject, for production of plural emails used for transmission of the image files at the mail producing section 35, the file name producing section 46 produces the file name of the image file of each email in a way that the date and time portions are different from each other according to the differences of the email production date and time of the email though the entry subject portions are the same to one another.

In the image reading apparatus 1, where plural image files are transmitted utilizing the email, the file name producing section 46 produces the plural file names based on the date and time addition email subject and the respective additional information data different from each other in the total file number. That is, the image reading apparatus 1, the file name producing section 46 produces the file names of the plural image files to be transmitted with the single email, in a manner that the respective additional information data are different from each other though the entry subject portions are the same to each other while the date, and time portions are the same to each other. Thus, in the image reading apparatus 1, where the single or plural image files are transmitted utilizing the email, the specific file names at least having a portion inevitably different form each other are automatically produced and assigned in shown the file contents with respect to any image files.

The mail producing section 35 transmits and memorizes the single or plural image files to and in the memory section 11, when transmitting the single or plural image files attached to the email to the sendee. The mail producing section 35 registers, in relation with the image files, the file names of the single or plural image files in the file management list, not shown, previously produced on the memory section 11, by memorizing the file names in transmitting the image files. With this registration, the mail producing section 35 manages the image files already transmitted, or namely, the image files already transmitted upon attached to the email, based on the file management list. The mail producing section 35 can re-transmit the already transmitted image files to the same sendee to the previous sendee as well as any sendee, different from the previous sendee from managing the already transmitted image files as described above.

When the user chooses a retransmission function of the image files via the operation panel 16, the mail producing section 35 reads out address entry image data from the memory section 11 and displays the address entry image 37 on the touch screen 14 in substantially the same way as described above. With this step, the mail producing section 35 renders the user enter at least the first sendee address as the address of the email on the address entry image 37 via the operation panel 16. Where the user at that time instructs to present the templates 30 to 34 on the address entry image 37, the mail producing section 35 produces the template presentation image data in substantially the same way as described above, and displays the template presentation image 43 on the touch screen 14. When the user selects the desired templates 30 to 34, the mail producing section 25 fetches the email subject form the selected templates 30 to 34.

The mail producing section 35 searches an image file having a file name including, as an entry subject portion showing the file contents, at least a part of the character string of the email subject among the already transmitted image files based o the email subject, and the file management list. That is, the mail producing section 35 searches the image file of the file name relating to the email subject. The mail producing section 35 produces the file presentation image data for presenting the searched single or plural image files as the file names and transmits the data to the touch screen 14 via the panel control section 20. With this processing, the mail producing section 35 displays the file presentation image, not show, based on the file presentation image data, and presents all of the image files relating to the email subject by the file names, to the user.

Where the user at that time selects any image file, as the file name, on the file presentation image via the operation panel 16, the mail producing section 35 reads out the selected image files from the memory section 11 in response to this. The mail producing section 35 executes a prescribed processing for displaying the image file, and transmits the obtained original document image data to the touch screen 14 via the panel control section 20. With this processing, the mail producing section 35 displays the image file as the original document image based on the original document image data on the touch screen 14 and can show the image file to the user. Where the user instructs to re-display the file presentation image via the operation panel 16, the mail producing section 35, in response to this instruction, displays the file presentation image on the touch screen 14 in lieu of the original document, image. Where the user selects again any of the image files as the file name, the mail producing section 35 displays the selected image file on the touch screen 24 as the original document image in substantially the same way. The mail producing section 35 thus shows the already transmitted image files as the original document images actually to the user, thereby rendering the user confirm as to whether it is to be retransmitted or not.

Where the user selects, as the retransmission objects, the image files in an arbitrary number, or namely in single or plural number, in a way that choosing a part or all among all image files relating to the email subject via the operation panel 10, the mail producing section 35 reads out the selected single or plural image files from the memory section 11. The mail producing section 35, in substantially the same way as described above, produces the email based on the templates 30 to 34 after replacing the email subject of the templates 30 to 34 selected by the user with the date and time addition email subject upon adding the email production date and time information. The mail producing section 35 transmits the email subject data indicating the date and time addition email subject to the file name producing section 46 together with the single or plural image files selected by the user. After producing the file names based on the date and time addition email subject in substantially the same way as described above, the file name producing section 46 at that time returns the single or plural image files to the mail producing section 35 upon assigning again the produced file names. With this processing, the mail producing section 35 attaches the single or plural image files returned from the file name producing section 46 to the email, and produces the email data indicating this, thereby transmitting the email data to the transmission control section 53. The transmission control section 53 transmits the email data to the sendee according to the email address via the network interface 18. The mail producing section 35 thus can retransmit the already transmitted image files upon attached to the email to the same sendee as the past sendee and to any sendee different from that.

In the image reading apparatus 1, the mail producing section 35 may produce the email in use of the email subject of the templates 30 to 34 as it is, or namely without adding any email production date and time information, and may attach the single or plural image files without changing the file names at the time of the past transmission. In the image reading apparatus 1, the mail producing section 35 can be so designed that the user may choose in advance any of the email subject of the templates 30 to 34 and the date and time addition email subject adding the email production date and time to the email subject above for producing the email for retransmission of the image files, and, when the user selects the retransmission function of the image files, may produce the email according to the setting.

To the contrary, if the user who confirms the file contents of the image file relating to the email subject, requests to transmit the new original document, image as the image file without retransmitting any image file, or namely instructing not to retransmit any image file relating to the email subject via the operation panel 16, the mail producing section 35 displays a prescribed message on the touch screen 14 and prompts the user to set single or plural original documents as the reading object to the scanner section 17. When the user sets the single or plural original documents as the reading object to the scanner section 17 and instructs to read the original document images via the operation panel 16, the mail producing section 35 executes the processing in substantially the same way as described above together with the image production control section 45 and the file name producing section 46, produces the email data of the email attaching new single or plural image files, and transmits the date to the sendee from the transmission control section 53 via the network interface 18.

As described above, when the user selects the retransmission function of the image file, the mail producing section 1 can retransmit the already transmitted single or plural image files in attached to the email, or can produce new single or plural images and transmit the files in attached to the email. The mail producing section 35 at that time memorizes the single or plural image files transmitted in utilizing the email in the memory section 11 and registers the file names of the single or plural image files in the file management list upon memorized in the memory section 11. In the image reading apparatus 1, the mail producing section 35 may display the new email production image 22 on the touch screen 14 according to the user's selection of the retransmission function of the image files, may render the user enter the email subject as well as the address and the email message, and may retransmit, with this email subject, the already transmitted image files by executing the processing in substantially the same way as described above, or may transmit the new image files.

In this embodiment, if transmitting the single or plural image files in attached to the email, the mail producing section 35 transmits the email, or namely the email in a state attaching no single or plural image file, and memorizes the email. The mail producing section 35 produces transmission record information of the emails in correspondence with transmission date and time information showing, e.g., the addresses (namely, the email addresses of the sendees), the date and time addition email subject, and the transmission date and time of the emails. The mail producing section memorizes the transmission record information in relation to the emails in the memory section 11. If the user requests to view the transmission record information via the operation panel 16, the mail producing section 35 reads out all of the transmission record information from the memory section 11 and produces the transmission record presentation image data based on the transmission record information. The mail producing section 35 transmits the transmission record presentation image data to the touch screen 14 via the panel control section 20, thereby displaying the transmission record presentation image, not shown, based on the transmission record presentation image data on the touch screen 14. With this processing, the mail producing section 35 can show transmission record of the emails (or namely, transmission record information of each email already transmitted) up to the current time via the transmission record presentation image to the user.

If the user selects any of transmission record information on the transmission record presentation image via the operation panel 16, the mail producing section 35 reads out the emails corresponding to the selected transmission record information from the memory section 11. The mail producing section 35 transmits the emails to the touch screen 14 via the panel control section 20 and displays the emails. With this processing, the mail producing section 35 renders the user confirm the contents of the emails transmitted in the past time. If the user requests to show the image files transmitted in attached to the email via the operation panel 16 as showing the email, the mail producing section 35 searches the single or plural image files transmitted in attached to the email in the memory section 11 based on the date and time addition email subject of the email and the file management list. The mail producing section 35 produces the file presentation image data for showing the searched single or plural image files as the file names, and displays the file presentation image on the touch screen 14 in substantially the same way as described above. The mail producing section 35 thus can show the single or plural image files transmitted in attached to the email as the file mimes via the file presentation image.

At that time, if the user selects any of the image files on the file presentation image as the file name via the operation panel 16, the mail producing section 35 displays the selected image files on the touch screen 14 in substantially the same way as described above as the original document images. The mail producing section 35 thus can render the user confirm the file contents of the single or plural image files transmitted in attached to the email by actually showing as the original document images. The image reading apparatus 1 may transmit again the email selected by the user based on the transmission record in accordance with user's transmission instruction in attaching the single or plural image files. The image reading apparatus 1 may change the sendee properly according to manipulations of the user, and may reduce the number of the attached image files, where the selected email is transmitted based on the transmission record.

If the user requests to show the already transmitted image files via the operation panel 16, the mail producing section 35 produces the file presentation image data for showing all of the already transmitted image files based on the file management list as the file names. The mail producing section 35 shows all of the already transmitted image files as the file names to the user via the file presentation image by displaying the file presentation image on the touch screen 14 in substantially the same way as described above. If the user at that time selects any image file on the file presentation image via the operation panel 16 as the file name, the mail producing section 35 also displays the selected image file on the touch screen 14 in substantially the same way as described above as the original document image. If the user requests to show the email used for transmission of the image files in a state showing the already transmitted image files as the original document images, the mail producing section 35 searches the email used for transmission of the image files in the memory section 11 based on the file name of the image files and the transmission record information. The mail producing section 35 reads out the searched emails from the memory section 11, and displays the emails upon transmission to the touch screen 14 via the panel control section 20. With this processing, the mail producing section 35 can render the user confirm the contents of the email, or namely the address and the email message used for transmission of the image files.

With the image reading apparatus 1, because the file name of the image file is produced based on the date and time addition email subject of the email, the date and time addition email subject and the file name are related to each other. In the image reading apparatus 1, the file contents can be confirmed easily by searching the image files based on the date and time addition email subject of the email used for transmission of the image files. In addition, in the image reading apparatus 1, the contents can be confirmed easily by searching the emails used for transmission of the image files based on the file names of the transmitted image files.

1-2 File Transmission Processing Step

Next, referring to FIG. 8, a flowchart, a file transmission processing step RT1 executed by the control section 10 is described. If the user, for example, selects the scan-to-email function via the operation panel 16, the control section 10 begins the file transmission processing step RT1 shown in FIG. 8 according to the file transmission processing program previously memorized in the memory section 11. When beginning the file transmission processing stop RT1, the control section 10 displays the template use inquiry image on the touch screen 14 at Step SP1, and judges as to whether the templates 30 to 34 are used or not for production of the email used for transmission of the image files. The control section 10 at Step SP1 makes the operation proceed to the subsequent Step SP2 where obtaining a positive result in which the user selects use of the templates 30 to 34 for production of the email via the operation panel 16. The control section 10 at Step SP2 displays the address entry image 37 on the touch screen 14 and waits for user's entry of email address and selection of the templates 30 to 34 used for production of the email. The control section 10 at Step SP2 makes the operation proceed to the subsequent Step SP3 where the user enters the email address and selects the templates 30 to 34 used for production of the email.

The control section 10 at Step SP3 waits for user's instruction of reading the original document images from the original documents. If the user instructs reading the original document, images via the operation panel 16 at Step SP3, the control section 10 makes the operation proceed to the subsequent Step SP4. The control section 10 at Step SP4 produces the single or plural original document image date upon optically scanning the original document images from the single or plural original documents by drive control of the scanner section 17 and makes the operation proceed to the subsequent Step SP5. The control section 10 at Step SP5 produces the date and time addition email subject in adding the email production date and time information to the email subject of the templates 30 to 34, and then produces the email based on the templates 30 to 34 and the date and time addition email subject, thereby making the operation proceed to the subsequent Step SP6. The control section 10 at Step SP6 produces the single or plural image files storing the original document image data, and makes the operation proceed to the subsequent Step SP7. The control section 10 at Step SP7 produces the file name or names of the single or plural image files based on the date and time addition email subject of the email, and assigns the file name or names to the single or plural image files, thereby making operation proceed to the subsequent Step SP8. The control section 10 at Step SP8 produces the email data as to attach the single or plural image files to the email and makes the operation proceed to the subsequent Step SP9. The control section 10 at Step SP9 transmits the email data to the sendee via the network interface 18 according to the email address of the sendee and makes the operation proceed to the subsequent Step SP10. At Step SP10, the control section 10 makes operation proceed to subsequent Step SP11 to end the file transmission proofing step RT1, after memorizing the email and the single or plural image files transmitted already in the memory section 11.

The control section 10, at Step SP1 described above, makes the operation proceed to Step SP12, if obtaining a negative result in which the user selects not to use the templates 30 to 34 for production of the email via the operation panel 16. The control section 10 at that time at Step SP12, displays the new email production image 22 on the touch screen 14 and waits for entries of the address, the email subject, and the email message of the email by the user. The control section 10 at Step SP12 makes the operation proceed to the subsequent Step SP3 if the user enters the address, the email subject, and the email message of the email on the new email production image 22 via the operation panel 16. If sequentially executing the processing of Step SP3 and Step S4 to make the operation proceed to Step SP5 after executing the processing of Step SP12, the control section 10 produce the email based on the new email production image 22 at Step SP5, sequentially executes the processing of step SP6 to step SP10, and ends the file transmission processing step RT1 after making the operation proceed to the subsequent step SP11.

1-3 File Retransmission Processing Step

Next, referring to a flowchart shown in FIG. 9 in assigning the same reference numbers to portions corresponding portions in FIG. 8, the file retransmission processing step RT2 executed by the control section 10 is described. If the user, for example, selects the retransmission function of the image files via the operation panel 16, the control section 10 begins the file retransmission processing step RT2 shown in FIG. 9 according to the file retransmission processing program previously memorized in the memory section 11. If beginning the file retransmission processing step RT2, the control section 10 makes the operation proceed to the subsequent Step SP21 after executing the processing of Step SP2. The control section 10 at Step SP21 searches the single or plural image files relating to the email subject, of the templates 30 to 34 selected by the user among the already transmitted image files memorized in the memory section 11 and makes the operation proceed to the subsequent Step SP22. The control section 10 at Step SP22 displays the file presentation image on the touch screen 14 to show all of the image files relating to the email subject to the user as the file names, and judges as to whether the image files subject to retransmission are selected. The control section 10 at Step SP22 makes the operation proceed to the subsequent Step S23 if obtaining a positive result upon users selection of the single or plural image files to be retransmitted among the single or plural image files relating to the email subject via the operation panel 16. The control section 10 at Step S23 produces the email based on the templates 30 to 34 and the date and time addition email subject after producing the date and time addition email subject by adding the email production date and time information to the email subject of the templates 30 to 34, and makes the operation proceed to the subsequent Step SP24 to end the file retransmission processing step RT2 upon sequentially executing the processing of Step SP7 to Step S10.

The control section 10 at Step SP22 makes the operation proceed to step SP25, if obtaining a negative result upon requested to transmit the new original document images as the image files without retransmitting the already transmitted image files. The control section at Step SP25 waits for instruction of reading the original document images from the original document. If the user instructs reading of the original document images via the operation panel 16 where the single or plural original documents as the reading objects are set to the scanner section 17, the control section 10 at Step SP25 executes the processing of Step SP4 and makes the operation proceed to the subsequent Step SP26. The control section 10 at Step SP26, after producing the date and time addition email subject in adding the email production date and time information to the email subject of the templates 30 to 34, produces the email based on the templates 30 to 34 and the date and time addition email subject, and ends the file retransmission processing step RT2 upon sequentially executing the processing of Step SP6 to Step S10 and making the operation proceed to Step SP24.

1-4 Operation and Advantages of Embodiment

With the structure as described above, the image reading apparatus 1 produces the email describing the date and time addition email subject according to user's manipulation at a time of file-sending in which the image files of the transmission object are attached to the email. The image reading apparatus 1 produces the file name based on the date and time addition email subject and assigns the file name to the image file. The image reading apparatus 1 transmits the image file or files upon attached to the email to the sendee. According to the above structure, with the image reading apparatus 1, the date and time addition email subject of the email reflects the file contents where the email is utilized for transmission of the email. Even without any entry of the file name of the image files by the user at a time of file transmission, the image reading apparatus 1 automatically produces the file name indicating the file contents based on the date and time addition email subject of the email utilized for transmission of the image files, and assigns the file names to the image files, thereby improving the usability.

The image reading apparatus 1 memorizes the templates 30 to 34 entered with the email subject and the email message in the memory section 11, and produces the email attaching the image files using the templates 30 to 34 selected by the user at the time of the file transmission. The image reading apparatus 1, at the time of the file transmission, does not require any user's entry of the file name as well as any entry of the email subject and the email message for production of the email, thereby making user's manipulation significantly simplified, and making the usability further improved.

The image reading apparatus 1, at the time of the file transmission, produces the date and time addition email subject by adding the email production date and time information to the email subject entered by the user in the subject entry portion 26 of the templates 30 to 34 and the new email production image 22. The image reading apparatus 1, based on the date and time addition email subject, produces the file name indicating the file contents of the image files from the entry subject portion and indicating the email production date and time of the email attaching the image files from the date and time portion, and assigns the file name to the image files. Accordingly, the image reading apparatus 1 can produce and assign, to the image files of each email, specific file names having the day and time portion different from each other in accordance with differences of the email production date and time of the plural emails while showing the file contents from the respective entry subject portions, even where using the templates 30 to 34 and the new email production image 22 entered with the same email subject for production of the plural emails used for transmission of the image files.

When transmitting the plural image files utilizing the email, the image reading apparatus 1 produces the plural file names in adding the specific additional information different from each other among the file names base on the date and time addition email subject and the specific additional information different from each other in the total file number. The image reading apparatus 1, to the plural image files transmitted as attached to the single email, can produce and assign the respective file names having specific additional information different from each other while displaying the file contents from the entry subject portions. The image reading apparatus 1 therefore can produce and assign the file names different from each other to the plural image files as the transmission objects, where not involving any date and time of the transmission and transmitting number at one time, while displaying the file contents from the entry subject portion. The image reading apparatus 1, though memorizing the plural image files already transmitted in the memory section 11, can manage those plural image files easily and precisely with the file names different from each other. The image reading apparatus 1 can render the sendee manage those plural image files easily and precisely with the file names different from each other where the plural image files are memorized in the sendee.

The image reading apparatus 1 memorizes the email used for transmission of the image files in addition to the plural image files already transmitted, in the memory section 11. The image reading apparatus 1 can provide relations between the email and the image files memorized in the memory section 11 with the date and time addition email subject and the file names, because producing the file names of the image files as the transmission objects based on the date and time addition email subject of the emails. With this processing, the image reading apparatus 1 can search the image files transmitted as attached to the email based on the date and time addition email subject of the emails already transmitted for the purpose of confirmation of the file contents and retransmission. The image reading apparatus 1 can easily search the emails used for the transmission of the image files based on the file name of the image files already transmitted for the purpose of confirmation of the file contents and retransmission.

The image reading apparatus 1 can easily search the image files relating to the email subject of the templates 30 to 34 selected by the user as the retransmission object, from the plural image files already transmitted during the file retransmission, because the date and time addition email subject, used for production of the file names includes the email subject.

2. Other Embodiments

2-1. Other Embodiment #1

It is to be noted that in the embodiment described above, the single or plural image files as the transmission objects are produced upon reading the original document images from the single or plural original documents as the reading object during the file transmission, and the image files are transmitted upon attached to the email after producing the file names based on the date and time addition email subject. This invention, however, is not limited to this, and can be in a form that at the time of the file transmission, the single or plural image files fetched previously from the exterior and memorized, or the single or plural image files fetched from the exterior at that time are made as the transmission objects, and can be transmitted in attached to the emails after producing and assigning the file name based on the date and time addition email subject, or namely after re-assigning the file name. The invention is not only for transmitting the files in attached to the email after producing and assigning the file name based on the date and time addition email subject where the image file is made as the transmission object, but also for transmitting the files in attached to the email after producing and assigning the file name based on the date and time addition email subject where various files such as, e.g., text files and program files are made as the transmission objects. That is, the invention is widely applicable to not only the image file but also various other transmission object files as the transmission object file to be transmitted using the email.

2-2 Other Embodiment #2

In the embodiment described above, described is the structure that the file name is produced based on the date and time addition email subject and assigned to the image files as the transmission objects. This invention, however, is not limited to this, and can be in a form that the file name is produced based on the email subject and assigned to the image files as the transmission objects. This invention may be formed in which new email subjects are produced in adding the email production date and time information to the email subject, or adding sender information or sendee information indicated with the sender or sendee (or namely the address) of the image files in a way of such as, e.g., the email address and the name, and in which the file name is produced based on the new email subject and assigned to the image files as the transmission objects. In this invention, the file name can be produced based on at least, email message and assigned to the image files as the transmission objects. That is, in the invention, for production of the file name, the email subject or the email message is usable, or a variety of information as well as the email subject or the email message may be used, as far as the information produces and assigns the file name indicating at least the file contents to the image files. With this invention, where the file name is produced based on the email subject and the email message as well as the sender information and the sendee information to be assigned to the image files, the sender of the image file or other senders can be recognized easily from the file name at the sendee of the image files.

2-3 Other Embodiment #3

In the embodiment described above, described is that the memory section 11 memorizes the already transmitted image files and the emails. This invention, however, is not limited to this, and can be in a form that the already transmitted image files and the emails can be memorized in personal computers and external memorizing apparatuses connected in a communicable way to the image reading apparatus 1 or in servers on a network or networks.

2-4 Other Embodiment #4

In the embodiment, described above, described is that the templates 30 to 34 used for the emails attaching the image files as the transmission objects are produced and memorized according to user's manipulation. This invention, however, is not limited to this, and can be in a form that a single template or plural templates produced from an external device such as, e.g., a personal computer according to user's manipulation may be fetched and memorized as the templates used for production of emails attaching the image files as the transmission objects. In this invention, the emails attaching the image files as the transmission objects may be produced using only the new email production image 22 without using any template.

2-5 Other Embodiment #5

In the embodiment described above, during the file transmission, the user may enter arbitrarily the file name indicating the file contents of the image files as the transmission objects where a template whose email subject is not entered is used or where the email subject is not entered in the new email production image 22, and the emails attaching the image files as the transmission objects may be produced using the template or the new email production image 22 in which the file name is entered automatically as the email subject. With such a structure, according to the invention, the sender and sendee can easily and precisely recognize that for which transmission of the image files the emails are used, from the email subject of the emails attaching the image files as the transmission objects.

2-6 Other Embodiment #6

In the embodiment described above, described is that the control section 10 of the image reading apparatus 1 executes the file transmission processing step RT1 and the file retransmission processing step RT2 described in referring to FIG. 8 and FIG. 9 according to the file transmission processing program and the file retransmission processing program memorized previously in the memory section 11. This invention, however, is not limited to this, and can be in a form that the control section 10 of the image reading apparatus 1 executes the file transmission processing step RT1 and the file retransmission processing step RT2 upon installing the file transmission processing program and the file retransmission processing program by a computer readable recording medium memorizing the file transmission processing program and the file retransmission processing program, or upon installing the file transmission processing program and the file retransmission processing program externally in utilizing wire as well as wireless communication media such as, e.g., local area network, the Internet, digital satellite board casting. As such a computer readable recording medium for installing and making executable the file transmission processing program and the file retransmission processing program in the image reading apparatus 1, exemplified are package media such as flexible discs. CD-ROMs (compact disc-read only memories), and DVDs (digital versatile discs), or semiconductor memories or magnetic discs memorizing temporarily or permanently the file transmission processing program and the file retransmission processing program. As a means for recording the file transmission processing program and the file retransmission processing program in the computer readable recording media, wire as well as wireless communication media such as, e.g., local area network, the Internet, digital satellite board casting can be used. As a computer readable recording medium, various programs can be memorized via various communication interfaces such as, e.g., routers and modems.

2-7 Other Embodiment #7

In the embodiment described above, described is that the file transmission apparatus and the image reading apparatus according to the invention are applied to the image reading apparatus 1 as an MFP described above in referring to FIG. 1 to FIG. 9. This invention, however, is not limited to this, and is applicable widely to a file transmission apparatus and an image reading apparatus having various structures such as, e.g., image reading apparatuses such as scanners, printers, facsimile machines, and photocopiers capable of transmitting the transmission object files in attached to the emails, and information processing apparatuses such as personal computers, smart phones, tablet terminals, and mobile phones.

2-7 Other Embodiment #8

In the embodiment described above, described is that the scanner section 17 described above is used as the reading section for reading images in referring FIG. 1 to FIG. 9. This invention, however, is not limited to this, and is applicable widely to reading sections of various structures such as, e.g., cameras picking up and reading the original document images on the surface of the original documents and the images displayed on the display section.

This invention is applicable to file transmission apparatuses and image reading apparatuses such as MFPs, scanners, printers, facsimile machines, photocopiers, personal computers, smart phones, tablet terminals, and mobile phones.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A file transmission apparatus comprising a control section configured to:
   produce an email attached with a transmission object file;
   produce a file name for the transmission object file attached to the email based on a character string included in the email processed by the control section and assign the produced file name to the transmission object file attached to the email;
   transmit the email attached with the transmission object file having the file name assigned by the control section;
   memorize in a file management list transmission object files that were previously transmitted by the control section, the previously transmitted transmission object files being memorized by their respective file names;
   select to perform retransmission of one of the memorized previously transmitted transmission object files;
   search the previously transmitted transmission object files in the file management list based on an email subject of the previously transmitted transmission object files upon selection to perform the transmission; and
   retransmit the email attached with the transmission object file located in the search based on the email subject.

2. The file transmission apparatus according to claim 1, wherein the control section is configured to produce the file name of the transmission object file based on a mail subject of the email produced by the control section, as the character string included in the email.

3. The file transmission apparatus according to claim 1, wherein the control section is configured to produce the file name of the transmission object file based on a character string included in a template used for producing the email at the control section, as the character string included in the email.

4. The file transmission apparatus according to claim 3, wherein the control section is configured to produce the file name of the transmission object file based on a mail subject of the email producible using the template, as the character string included in the email.

5. The file transmission apparatus according to claim 1, wherein the control section is configured to produce the email using a template in which at least the mail subject is entered among the sendee information, the mail message, and the mail subject of the email.

6. The file transmission apparatus according to claim 1, wherein the control section is configured to produce the file name based on the mail subject in addition with email production date and time information showing the date and time producing the email at the control section, as the character string included in the email.

7. The file transmission apparatus according to claim 1, wherein the control section is configured to produce plural file names based on the mail subject serving as the character string included in the email as well as respective additional information data different from each other in a number of the file total number when transmitting the plural transmission object files and assigns the file names to the plural transmission object files, and wherein the control section transmits the plural transmission object files assigned with the file names from the control section in attached to the email.

8. The file transmission apparatus according to claim 1, wherein the control section is configured to produce the file name based on the mail subject, sender or sendee information of the email produced from the control section, as the character string included in the email.

9. An image reading apparatus comprising:
   a reading section that reads an image; and
   a control section configured to:
      produce an email attached with an image file of the image read at the reading section, as a transmission object file;
      produce a file name of the transmission object file attached to the email based a character string included in the email processed by the control section and assign the produced file name to the transmission object file attached to the email;
      transmit the email attached with the transmission object file having the file name assigned by the control section;
      memorize in a file management list transmission object files that were previously transmitted by the control section, the previously transmitted transmission object files being memorized by their respective file names;
      select to perform retransmission of one of the memorized previously transmitted transmission object files;
      search the previously transmitted transmission object files in the file management list based on an email subject of the previously transmitted transmission object files upon selection to perform the transmission; and retransmit the email attached with the transmission object file located in the search based on the email subject.

* * * * *